United States Patent
Liu et al.

(10) Patent No.: US 12,361,520 B2
(45) Date of Patent: Jul. 15, 2025

(54) SYSTEMS AND METHODS FOR DEBLURRING AND DENOISING MEDICAL IMAGES

(71) Applicant: Shanghai United Imaging Intelligence Co., Ltd., Shanghai (CN)

(72) Inventors: Yikang Liu, Cambridge, MA (US); Zhang Chen, Brookline, MA (US); Xiao Chen, Lexington, MA (US); Shanhui Sun, Lexington, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 407 days.

(21) Appl. No.: 17/989,205

(22) Filed: Nov. 17, 2022

(65) Prior Publication Data

US 2024/0169486 A1 May 23, 2024

(51) Int. Cl.
  *G06T 5/73* (2024.01)
  *G06T 5/50* (2006.01)
  *G06T 5/70* (2024.01)

(52) U.S. Cl.
  CPC .............. *G06T 5/50* (2013.01); *G06T 5/70* (2024.01); *G06T 5/73* (2024.01);
  (Continued)

(58) Field of Classification Search
  CPC .... G06T 5/50; G06T 5/70; G06T 5/73; G06T 2207/10016; G06T 2207/10121;
  (Continued)

(56) References Cited

U.S. PATENT DOCUMENTS

| 8,249,377 B1 | 8/2012 | Banner et al. |
| 8,379,120 B2 | 2/2013 | Wang et al. |

(Continued)

FOREIGN PATENT DOCUMENTS

| CN | 112668643 A * | 4/2021 |
| EP | 2175416 A1 | 4/2010 |

(Continued)

OTHER PUBLICATIONS

Deblurring X-ray Transmission Images (Year: 2020).*

*Primary Examiner* — Huo Long Chen
(74) *Attorney, Agent, or Firm* — Zhong Law, LLC

(57) ABSTRACT

Deblurring and denoising a medical image such as X-ray fluoroscopy images may be challenging, and deep-learning based techniques may be employed to meet the challenge. An artificial neural network (ANN) may be trained using training images with synthetic noise and as well as training images with real noise. The parameters of the ANN may be adjusted during the training based on at least a first loss designed to maintain continuity between consecutive medical images generated by the ANN and a second loss designed to maintain similarity of patches inside a medical image generated by the ANN. The parameters of the ANN may be further adjusted based on a third loss that may be calculated from ground truth associated with the synthetic training images. Transfer learning between the synthetic images and the real images may be accomplished using these techniques.

18 Claims, 5 Drawing Sheets

(52) U.S. Cl.
CPC ............... *G06T 2207/10016* (2013.01); *G06T 2207/10121* (2013.01); *G06T 2207/20081* (2013.01); *G06T 2207/20084* (2013.01); *G06T 2207/30004* (2013.01)

(58) Field of Classification Search
CPC . G06T 2207/20081; G06T 2207/20084; G06T 2207/30004; G06T 2207/10116; G06T 2207/20172; G06N 3/0464; G06N 3/084
See application file for complete search history.

(56) References Cited

U.S. PATENT DOCUMENTS

| | | |
|---|---|---|
| 11,151,694 B2 | 10/2021 | Ferrés et al. |
| 2017/0372193 A1 | 12/2017 | Mailhe et al. |
| 2020/0237452 A1* | 7/2020 | Wolf ........................ G06F 3/048 |

FOREIGN PATENT DOCUMENTS

| | | | | |
|---|---|---|---|---|
| EP | 4187484 A1 * | 5/2023 | ............. | G06T 5/002 |
| KR | 20210026934 A * | 3/2021 | | |
| WO | 2021208122 A1 | 10/2021 | | |
| WO | WO-2022022494 A1 * | 2/2022 | ............. | G06T 5/002 |

\* cited by examiner

SYSTEMS AND METHODS FOR DEBLURRING AND DENOISING MEDICAL IMAGES

BACKGROUND

Medical image restoration involving both denoising and deblurring may be challenging to accomplish since these tasks may have opposing objectives, with denoising aiming at suppressing high frequency components in the image (e.g., since the high frequency components may be dominated by noise) and deblurring aiming at enhancing the high frequency components to sharpen the image. In addition, real, noisy medical images may be difficult to denoise because the noise in those images may not follow a constant distribution (e.g., the noise may change with respect to time and/or space) and, as such, techniques that work well with synthetic, noisy medical images may not transfer well when used to process images with real noise. Accordingly, systems, methods, and instrumentalities capable of deblurring and denoising real medical images such as X-ray fluoroscopy images are desirable.

SUMMARY

Described herein are systems, methods, and instrumentalities associated with deblurring and denoising medical images such as X-ray fluoroscopy images included in an X-ray fluoroscopy video. In accordance with one or more embodiments of the present disclosure, an apparatus configured to perform the deblurring and denoising tasks may include at least one processor configured to obtain a sequence of input medical images, process the sequence of input medical images through an artificial neural network (ANN), and generate, based on the processing, a sequence of output medical images that corresponds to the sequence of input medical images, where at least one of the output medical images may be characterized by reduced blurriness and reduced noise compared to a corresponding one of the input medical images. The ANN may be trained using at least a first training dataset comprising medical images with synthetic noise and a second training dataset comprising medical images with real noise. The parameters of the ANN may be adjusted during the training based on at least a first loss designed to maintain continuity between consecutive medical images generated by the ANN and a second loss designed to maintain similarity of two or more patches (e.g., patches that are supposed to be similar in a feature space) inside a medical image generated by the ANN.

In examples, the medical images in the first training dataset described herein may be associated with corresponding deblurred and denoised ground truth images and the ANN may be configured to, during the training, predict a respective deblurred and denoised medical image based on a corresponding one of the medical images in the first training dataset and adjust the parameters of the ANN further based on a third loss that indicates a difference between the deblurred and denoised medical image predicted by the ANN and a corresponding deblurred and denoised ground truth image.

In examples, the ANN may include a plurality of serially coupled sub-networks, where at least one (e.g., each) of the serially coupled sub-networks may include a deblurring module and a denoising module. The training of the ANN may comprise generating, using the ANN, a first output medical image and a second output medical image based on two consecutive medical images from the second training dataset, respectively, determining a first set of noise-resistant features of the first output medical image, determining a second set of noise-resistant features of the second output medical image, calculating the first loss based at least on the first set of noise-resistant features and the second set of noise-resistant features (e.g., the first loss may indicate a difference between the first set of noise-resistant features and the second set of noise-resistant features), and adjusting the parameters of the ANN to reduce the first loss. In examples, the first set of noise-resistant features of the first output medical image may be determined by extracting (e.g., using a pre-trained feature extraction neural network) a first plurality of features from the first output medical image, adding noise to the first output medical image to obtain a first noisy output medical image, extracting a second plurality of features from the first noisy output medical image, and selecting the features that remain substantially unchanged before and after the noise is added to the first output medical image as the first set of noise-resistant features. Similarly, the second set of noise-resistant features of the second output medical image may be determined by extracting (e.g., using the pre-trained feature extraction neural network) a third plurality of features from the second output medical image, adding noise to the second output medical image to obtain a second noisy output medical image, extracting a fourth plurality of features from the second noisy output medical image, and selecting features that remain substantially unchanged between and after the noise is added to the second output medical image as the second set of noise-resistant features.

In examples, the training operations of the ANN may include generating, using the ANN, a deblurred and denoised medical image based on a medical image from the second training dataset, determining a first set of noise-resistant features of a first patch inside the deblurred and denoised medical image, determining a second set of noise-resistant features of a second patch inside the deblurred and denoised medical image (e.g., the second patch may include similar pixel values or features as the first patch), calculating the second loss based at least on the first set of noise-resistant features and the second set of noise-resistant features (e.g., the second loss may indicate a difference between the first set of noise-resistant features and the second set of noise-resistant features), and adjusting the parameters of the ANN to reduce the second loss. The first set of noise-resistant features of the first patch may be determined by extracting a first plurality of features from the first patch, adding noise to the first patch to obtain a first noisy patch, extracting a second plurality of features from the first noisy patch, and selecting the features that remain substantially unchanged before and after the noise is added to the first patch as the first set of noise-resistant features. Similarly, the second set of noise-resistant features of the second patch may be determined by extracting a third plurality of features from the second patch, adding noise to the second patch to obtain a second noisy patch, extracting a fourth plurality of features from the second patch, and selecting the features that remain substantially unchanged before and after the noise is added to the second patch as the second set of noise-resistant features.

In examples, the training operations of the ANN may include generating, using the ANN, a first deblurred and denoised medical image based on a first medical image of the second training dataset, where the first deblurred and denoised medical image may be generated by first deblurring the first medical image and then denoising the first medical image. The training operations may further include generating, using the ANN, a second deblurred and denoised medical image based on the first medical image of the second training dataset, where the second deblurred and denoised medical image may be generated by first denoising the first medical image and then deblurring the first medical image. The parameters of the ANN may then be adjusted with an objective to reduce a difference between the first deblurred and denoised medical image and the second deblurred and denoised medical image.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings.

Figure 1:
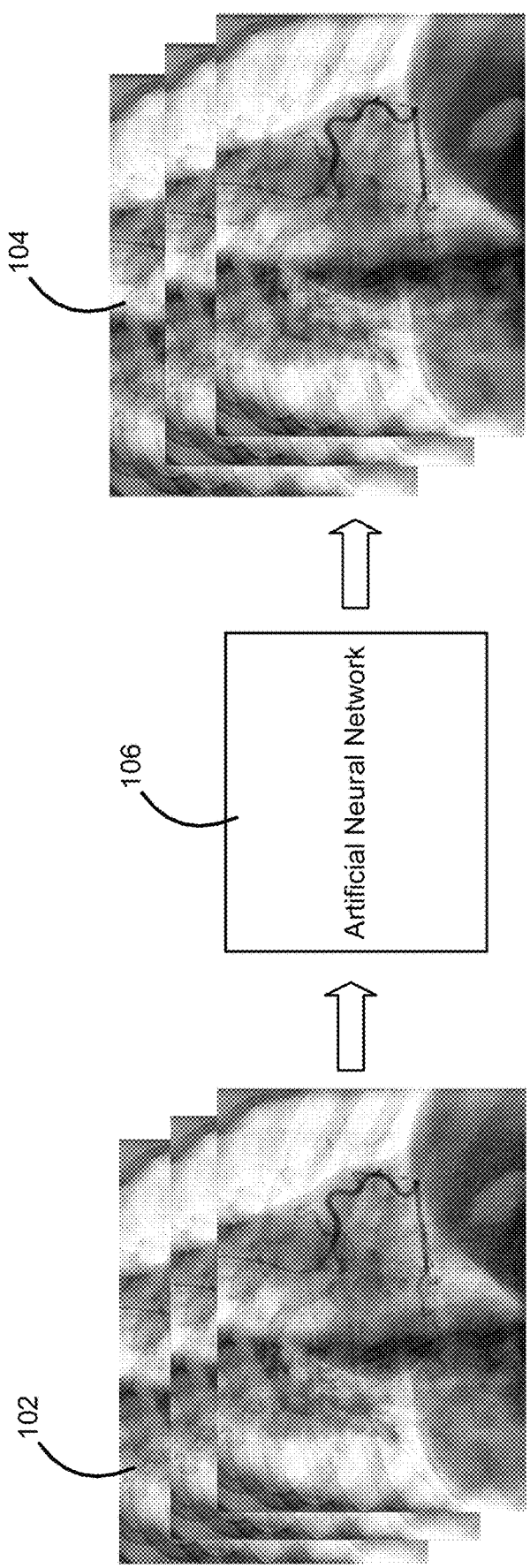
FIG. 1 is a diagram illustrating an example of deblurring and denoising a sequence of medical images using deep-learning (DL) based techniques, in accordance with one or more embodiments of the present disclosure.

FIG. 1 illustrates an example of deblurring and denoising medical images using deep-learning (DL) based techniques. As shown, a sequence of medical images 102 such as a sequence of X-ray fluoroscopy images (e.g., from an X-ray fluoroscopy video) may be obtained, where one or more (e.g., each) of the medical images 102 may include an amount of blurriness and noise. Such blurriness and noise may be undesirable since, for example, they may hinder the ability to identify small features that may be only a few pixels in size for disease detection and treatment. Mathematically, the degradation process that may create the blurriness and noise in medical images 102 may be expressed as $y=x*k+n$, where x may represent a high-quality, clean image (e.g., free of blurriness and noise), k may represent a blur kernel (e.g., such as a Gaussian kernel), n may represent an added noise, and y may represent the resulting degraded image (e.g., medical image 102 in FIG. 1). As such, removing the blurriness and noise from (e.g., to deblur and denoise) medical images 102 may be an ill-posed problem because it may involve recovering the clean image x from the observed, degraded image y, without prior knowledge of the blur kernel k and/or noise n. Existing techniques for deblurring (e.g., removing or reducing the blurriness of) medical images 102 may rely on estimating and calculating the point spread function of the imaging system used to capture the medical images, but those techniques may add artifacts to and/or increase the noise in the medical images. Similarly, currently available denoising (e.g., removing or reducing noise) techniques may work by estimating an optical flow associated with the medical images and may thus require future image frames that may not be available in real-time applications.

To solve these problems and restore (e.g., deblur and denoise) the medical images 102 in a manner that satisfies real clinical needs, deep learning based techniques may be applied to train a machine learning (ML) model for predicting (e.g., generating) a sequence of output medical images 104 that may correspond to the sequence of input medical images 102, where at least one of the output medical images 104 may be a deblurred and denoised version of the corresponding input medical image (e.g., the output images 104 may be characterized by reduced blurriness and noise compared to the input images 102). Such an ML model may be learned and implemented via an artificial neural network (ANN) 106, which may be trained using at least a first training dataset comprising medical images with synthetic noise and a second training dataset comprising medical images with real noise to reduce both blurriness and noise in the sequence of input medical images 102. As will be described in greater detail below, ANN 106 may, through the training, learn to transfer the knowledge and/or ability acquired from processing the synthetic images to processing real images at an inference time. The ANN may be trained to do so, for example, based at least on a first loss designed to maintain continuity between consecutive medical images generated by the ANN and on a second loss designed to maintain similarity of two or more patches (e.g., patches that are similar to each other in a feature space) inside a medical image generated by the ANN. ANN 106 may additionally utilize a third loss calculated based on an image generated by the ANN and a corresponding ground truth image to further improve the transfer learning capabilities of the network.

Figure 2:
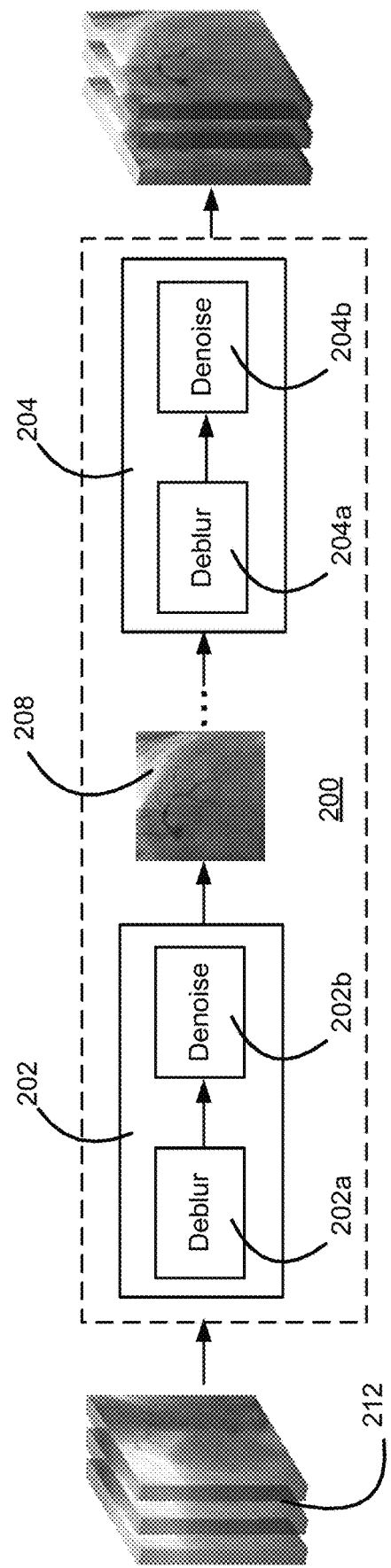
FIG. 2 is a diagram illustrating an example of an artificial neural network (ANN), in accordance with one or more embodiments of the present disclosure.

Various neural network architectures may be employed to implement the ANN 106. For example, the ANN may be implemented as an unfolding neural network comprising a plurality of sub-networks (e.g., six sub-networks), where one or more (e.g., each) of the sub-networks may include a deblurring module and a denoising module, and the sub-networks may be configured to deblur and denoise an input image sequence iteratively. FIG. 2 illustrates an example of such a neural network 200 (e.g., the ANN in FIG. 1), which may include a plurality of sub-networks 202, 204, etc. One or more (e.g., each) of these sub-networks may include a deblurring module (e.g., 202a, 204a, etc.) and a denoising module (e.g., 202b, 204b, etc.), and may be configured to receive an input image (e.g., from a medical image sequence 206 or the output of a previous sub-network) and produce an output image (e.g., 208) that is characterized by reduced blurriness and noise compared to the input image. In examples, the deblurring module may be configured to implement programming logic for applying one or more fast Fourier Transform (FFT) and inverse FFT operations (e.g., utilizing a prior blur kernel such as a Gaussian kernel) to the input image and the denoising module may include a convolutional neural network (CNN) (e.g., having a residual-block-based U-net architecture) that may be trained to extract features associated with an underlying anatomical structure from the input image and predict a denoised image based on the extracted features.

The CNN described herein may include an input layer and one or more convolutional layers, pooling layers, and/or fully-connected layers. The input layer may be configured to receive the input image while each of the convolutional layers may include a plurality of convolution kernels or filters with respective weights for extracting features associated with an underlying anatomical structure from the input image. The convolutional layers may be followed by batch normalization and/or linear or non-linear activation (e.g., such as a rectified linear unit (ReLU) activation function), and the features extracted through the convolution operations may be down-sampled through one or more pooling layers to obtain a representation of the features, for example, in the form of a feature vector or a feature map. The CNN may further include one or more un-pooling layers and one or more transposed convolutional layers. Through the un-pooling layers, the features extracted through the operations described above may be up-sampled, and the up-sampled features may be further processed through the one or more transposed convolutional layers (e.g., via a plurality of deconvolution operations) to derive an up-scaled or dense feature map or feature vector. The dense feature map or vector may then be used to predict a denoised image (e.g., the output image 208), before the denoised image is passed to the next sub-network for further deblurring and denoising.

It should be noted that although the term "sub-network" is used to describe the neural network 200, those skilled in the art will appreciate that the "sub-network" may also include components (e.g., hardware and/or software components) that may not be traditionally deemed as parts (e.g., layers) of a neural network. Those skilled in the art will also appreciate that the neural network 200 may be trained to perform additional functions (e.g., in addition to deblurring and denoising) including, for example, enhancing the contrast of the deblurred and denoised images generated by the neural network for better visualization purposes.

Figure 3:
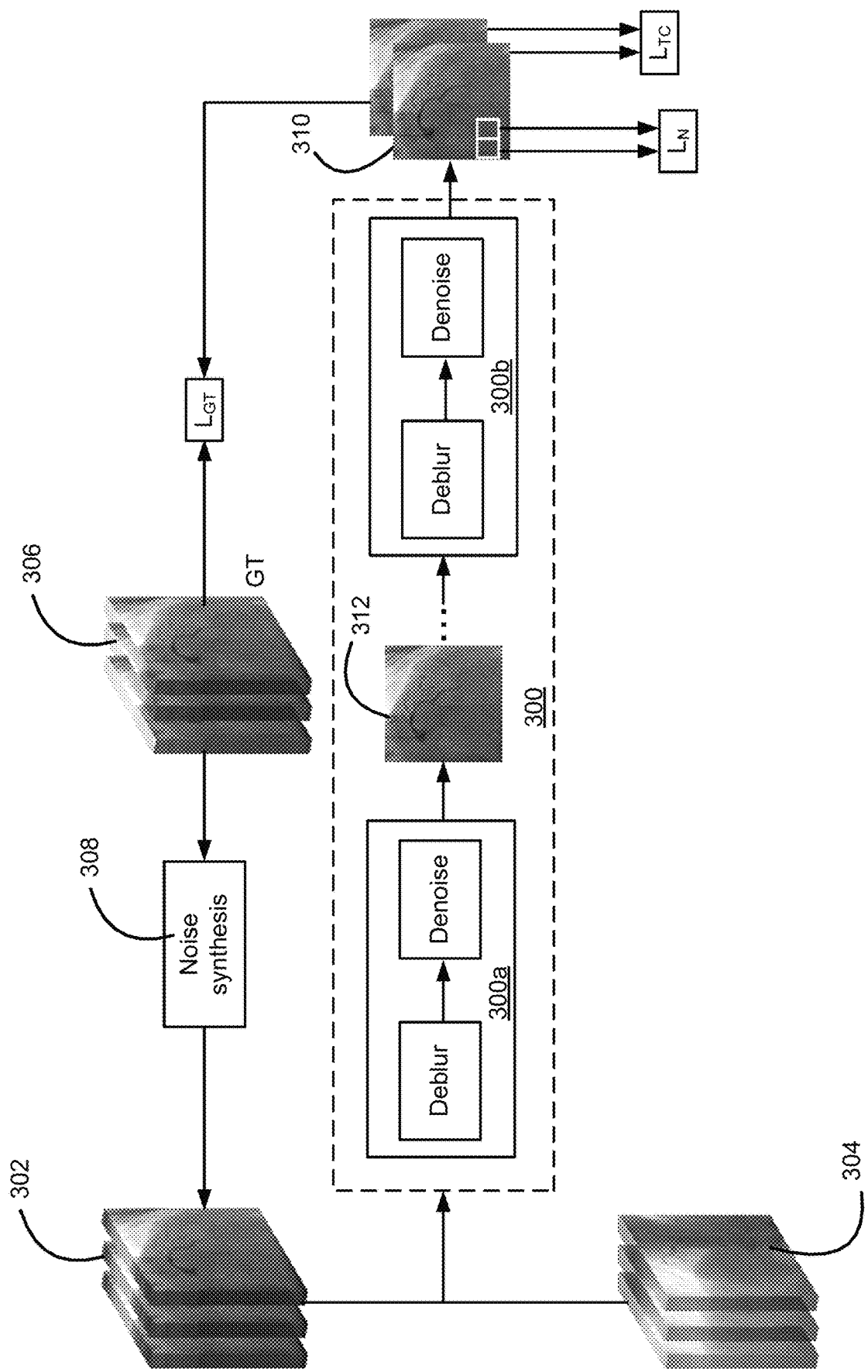
FIG. 3 is a diagram illustrating an example process for training an ANN to perform a deblurring and a denoising task, in accordance with one or more embodiments of the present disclosure.

FIG. 3 illustrates an example process for training an ANN 300 (e.g., the ANN 106 of FIG. 1 or neural network 200 of FIG. 2) to perform the deblurring and denoising operations described herein. As shown, the training may be conducted using both synthetic medical images 302 and real medical images 304, and based on multiple loss functions (e.g., $L_{TC}$, $L_N$, and/or $L_{GT}$) design to improve the outcome of the training such as ensuring that the knowledge learned from the synthetic medical images 302 may be transferred to (e.g., used for) the processing of real medical images 304. The synthetic medical images 302 (e.g., in a first training dataset) may be generated based on high-quality (e.g., without blurriness and noise), ground truth (GT) medical images 306 and include synthetic noise added by a noise synthesis module 308, which may be a part of an apparatus configured to perform the deblurring and denoising tasks described herein. The noise synthesis module 308 may be configured to determine a distribution of noise from the real medical images 304 and generate similarly distributed synthetic noise to be added to the synthetic medical images 302. The noise synthesis module 308 may, for example, extract noise variances associated with the real medical images 304 as a function of the pixel intensity of the real medical images 304 (e.g., by applying a high pass filter to the real medical images 304) and fit a power law regression to the function to generate the synthetic noise that may resemble the noise in the real medical images 304.

While the noise generated by noise synthesis module 308 and added to the synthetic medical mages 302 may resemble that of the real medical images 304, the precise distribution of the real noise may be difficult to replicate since, for example, the statistics of the real noise may not follow a constant distribution and may instead change with respect to time and space. Therefore, the training of ANN 300 may be conducted using both the synthetic medical images 302 and the real medical images 304. For example, as illustrated by the upper branch of FIG. 3, ANN 300 may, during the training, be configured to receive a medical image from the training dataset comprising the synthetic medical images 302 and generate (e.g., predict) a deblurred and denoised output image 310. ANN 300 may then compare the output image 310 with a corresponding ground truth image 306 and determine a loss (e.g., $L_{GT}$) that may indicate the difference between the output image 310 predicted by the ANN and the ground truth image 306. The loss ($L_{GT}$) may be calculated based on various loss functions including, for example, a mean squared error (MSE)-based loss function, an L1 or L2 norm-based loss function, etc., and ANN 300 may be configured to adjust its parameters (e.g., weights associated with the various layers of the ANN) to minimize or reduce the loss (e.g., by backpropagating a gradient descent of the loss through the ANN).

The training of the ANN 300 may also involve obtaining a medical image from the training dataset comprising the real medical images 304 and processing the medical image through the ANN to obtain another deblurred and denoised output image 310 (e.g., 310 may be used herein to represent output images generated from either the synthetic medical images 302 or the real medical images 304). For example, in response to obtaining the input medical image 304, ANN 300 may be configured to process the input medical image 304 through a plurality of sub-networks (e.g., 300a, 300b, etc.) of the ANN to iteratively deblur and denoise the input medical image (e.g., each sub-network of the ANN may include a deblurring module and a denoising module), generating a deblurred and denoised image 312 as an output of the sub-network (e.g., 300a, 300b, etc.). As ANN 300 processes consecutive images from the real medical image dataset 304, a loss (e.g., $L_{TC}$) may be calculated and used to force the ANN to adjust its parameters such that consistency between consecutive outputs of the ANN may be achieved. For example, ANN 300 may process a first medical image (e.g., with a timestamp of T−1) from the real medical image dataset 304 and generate a first deblurred and denoised output image $I_{T-1}$. ANN 300 may also process a second medical image (e.g., with a timestamp of T) from the real medical image dataset 304 that is consecutive in time to the first medical image and generate a second deblurred and denoised output image $I_T$. The loss, $L_{TC}$, may then be calculated based on a first set of noise-resistant features $F_{T-1}$ of the first output image $I_{T-1}$ and a second set of noise-resistant features $F_T$ of the second output medical image $I_T$, where the loss may indicate a difference between the first set of noise-resistant features $F_{T-1}$ and the second set of noise-resistant features $F_T$, and ANN 300 may be configured to further adjust its parameters to reduce the loss. Such a loss (e.g., $L_{TC}$) may help improve the training of ANN 300 because real medical images 304 may include a sequence of consecutive images from a medical video (e.g., an X-ray fluoroscopy video) and, as such, features of an underlying anatomical structure in the images may be expected to remain consistent (e.g., with little variations) between consecutive timestamps. Accordingly, ANN 300, if properly trained, may also be expected to produce consistent results between consecutive timestamps (e.g., pixels that have higher feature similarities should be more similar in pixel values).

In examples, $L_{TC}$ may be calculated based on the following equations:

$$S = \frac{F_T \cdot F_{T-1}}{\|F_T\| \cdot \|F_{T-1}\|} \quad\quad 1)$$

$$L_{TC} = \|S \cdot I_T - S \cdot I_{T-1}\| \quad\quad 2)$$

where $I_T$ and $I_{T-1}$ may represent output images generated by ANN 300 that may be associated with timestamps T and T−1, respectively, and $F_T$ and $F_{T-1}$ may represent the noise-resistant features extracted from $I_T$ and $I_{T-1}$, respectively.

Various techniques may be used to derive the noise-resistant features of the output image generated by ANN 300. For instance, a pre-trained feature extraction neural network (e.g., a CNN having multiple convolutional layers and/or pooling layers) may be used to extract a first plurality of features from the output image. Noise (e.g., synthetic noise) may then be added to the output image to obtain a corresponding noisy output image, and the pre-trained feature extraction neural network may be used again to extract a second plurality of features from the noisy output image. From the first and second pluralities of features, those that remain substantially unchanged before and after the noise is added to the output image may be selected as the noise-resistant features, which may represent the intrinsic features of the underlying anatomical structure in the output image.

An additional loss may be determined during the training of ANN 300 based on patches inside an output image generated by the ANN. Such a loss (e.g., $L_N$ shown in FIG. 3) may be calculated in a similar manner as $L_{TC}$ and may be used to enforce similarity between the patches (e.g., patches that are supposed to be similar in a feature space). For example, based on an input image from the real medical image dataset 304, ANN 300 may generate a deblurred and denoised output image and $L_N$ may be calculated based on a first set of noise-resistant features $F_i$ of a first patch i inside the output image and a second set of noise-resistant features $F_j$ of a second patch j inside the output image, where the loss may indicate a difference between the first set of noise-resistant features $F_i$ and the second set of noise-resistant features $F_j$. ANN 300 may then be configured to further adjust its parameters to reduce the loss, $L_N$. $L_N$ may, for example, be calculated based on the following equations:

$$S_{ij} = \frac{F_i \cdot F_j}{\|F_i\| \cdot \|F_j\|} \quad\quad 3)$$

$$L_N = \|S_{ij} \cdot P_i - S_{ij} \cdot P_j\| \quad\quad 4)$$

where $P_i$ and $P_j$ may represent two patches in an output image generated by ANN 300, and $F_i$ and $F_j$ may represent the noise-resistant features extracted from $P_i$ and $P_j$, respectively.

The noise-resistant features of the patches may be extracted in a similar manner as the noise-resistant features of the consecutive images described above. For instance, a pre-trained feature extraction neural network (e.g., the same feature extraction network described above or a different feature extraction network) may be used to extract a first plurality of features from the patch (e.g., $P_i$ or $P_j$). Noise (e.g., synthetic noise) may then be added to the patch to obtain a corresponding noisy patch, and the pre-trained feature extraction neural network may be used again to extract a second plurality of features from the noisy patch. From the first and second pluralities of features, those that remain substantially unchanged before and after the noise is added to the patch may be selected as the noise-resistant features.

The losses described herein (e.g., $L_{GT}$, $L_N$, $L_{TC}$) may be used individually or combined together (e.g., into one loss) to facilitate the training of ANN 300. For example, the losses may be assigned respective weights and combined into one loss, L, based on the following equation:

$$L = L_{GT} + \alpha L_N + \beta L_{TC} \quad\quad 5)$$

where the respective weights (e.g., $\alpha$, $\beta$, etc.) for the losses may be adjusted during the training to achieve optimal results.

The ability of ANN 300 to deblur and denoise a real, noisy medical image may be further improved by alternating the order in which the deblurring and denoising operations are performed during the training of the ANN. For example, during the training of ANN 300, the ANN may be configured to generate a first deblurred and denoised output image based on an input training image by first deblurring the input training image and then denoising the input training image. The ANN may also be configured to generate a second deblurred and denoised medical image based on same input training image by first denoising the input training image and then deblurring the input training image. The ANN may then adjust its parameters with an objective to reduce the difference between the first deblurred and denoised image and the second deblurred and denoised image.

Figure 4:
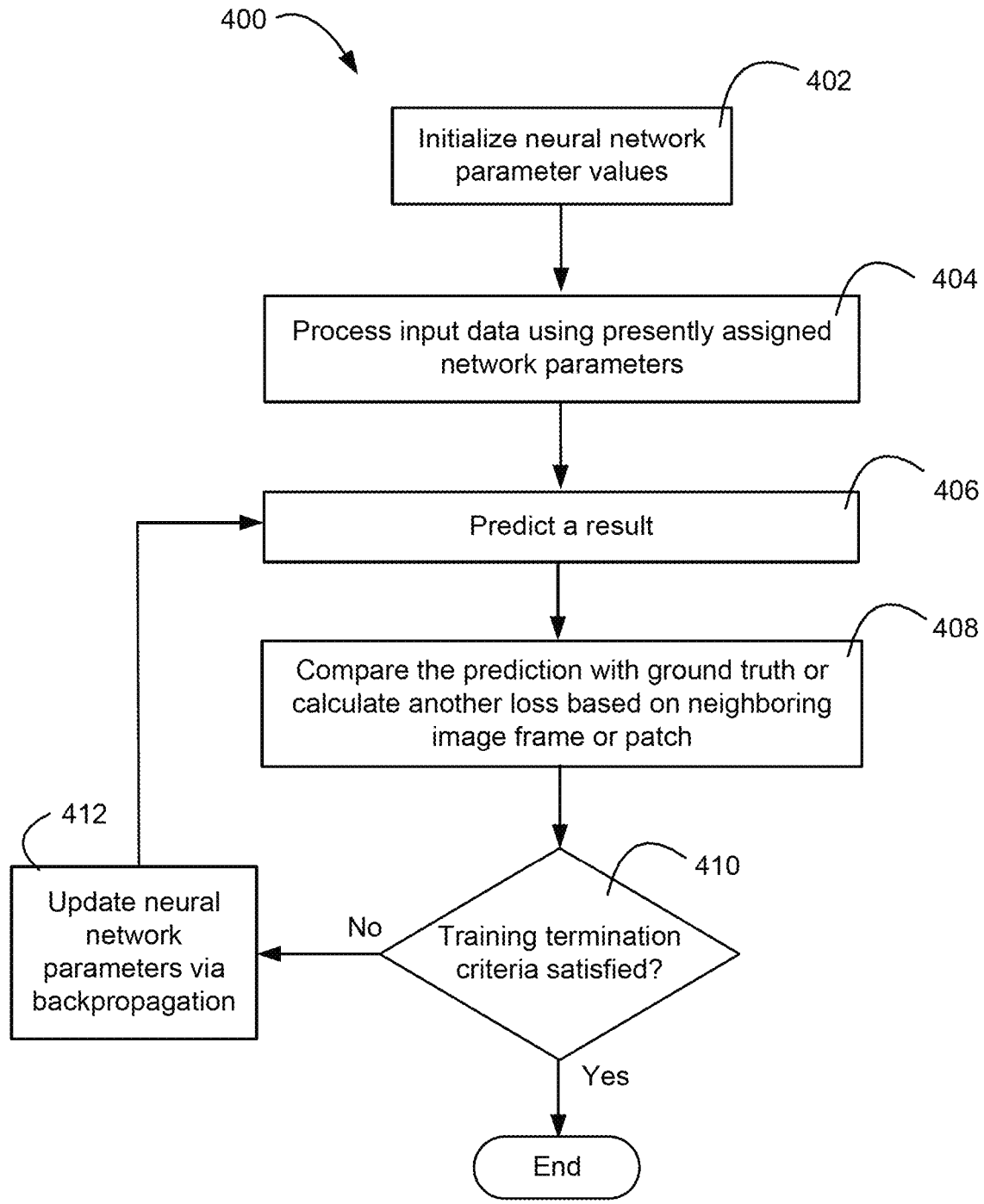
FIG. 4 is a flow diagram illustrating example operations that may be associated with training a neural network, in accordance with one or more embodiments of the present disclosure.

FIG. 4 illustrates example operations 400 that may be associated with training a neural network (e.g., the ANN 106 of FIG. 1, neural network 200 of FIG. 2, and/or ANN 300 of FIG. 3) to perform one or more of the tasks described herein. As shown, the training operations 400 may include initializing the operating parameters of the neural network (e.g., weights associated with various layers of the neural network) at 402, for example, by sampling from a probability distribution or by copying the parameters of another neural network having a similar structure. The training operations 400 may further include processing an input (e.g., a blurry and noisy training image) using presently assigned parameters of the neural network at 404, and making a prediction for a desired result (e.g., deblurred and denoised image) at 406. The prediction result may be compared to a ground truth at 408 (e.g., if the training is supervised, as may be the case with synthetic medical image dataset 302 of FIG. 3) to determine a loss associated with the prediction, for example, based on a loss function such as mean squared errors between the prediction result and the ground truth. The prediction result may also be used to calculate another loss (e.g., if the training is unsupervised, as may be the case with real medical image dataset 304 of FIG. 3) such as $L_{TC}$ and/or $L_N$ described with respect to FIG. 3. At 410, the loss(es) may be evaluated to determine whether one or more training termination criteria are satisfied. For example, the training termination criteria may be determined to be satisfied if the loss is below a threshold value or if the change in the loss between two training iterations falls below a threshold value. If the determination at 410 is that the termination criteria are satisfied, the training may end; otherwise, the presently assigned network parameters may be adjusted at 412, for example, by backpropagating a gradient descent of the loss function through the network before the training returns to 406.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training method are depicted and described herein, and not all illustrated operations are required to be performed.

Figure 5:
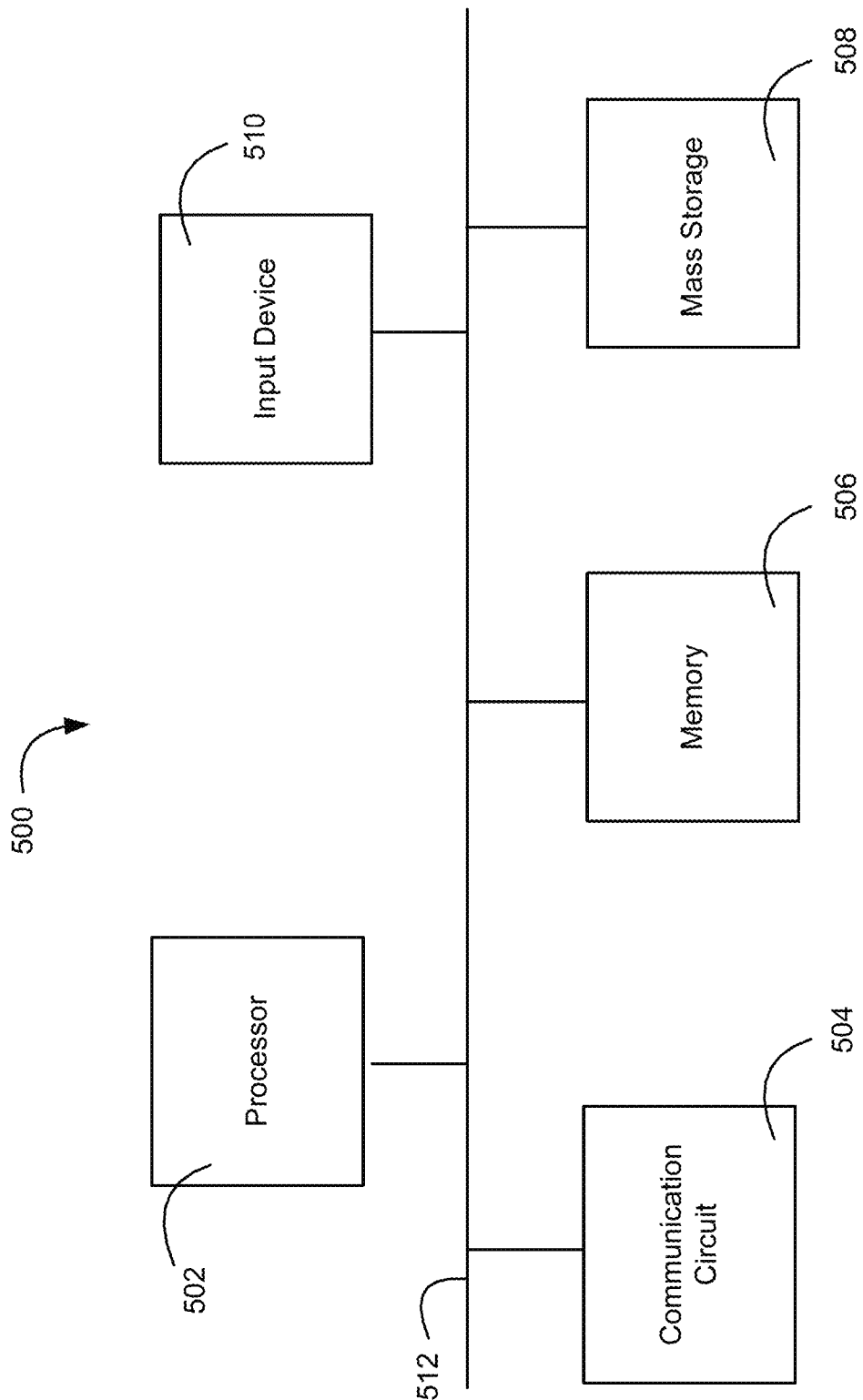
FIG. 5 is a block diagram illustrating example components of an apparatus that may be configured to perform the tasks described in accordance with one or more embodiments of the present disclosure.

The systems, methods, and/or instrumentalities described herein may be implemented using one or more processors, one or more storage devices, and/or other suitable accessory devices such as display devices, communication devices, input/output devices, etc. FIG. 5 illustrates an example apparatus 500 that may be configured to perform the automatic image annotation tasks described herein. As shown, apparatus 500 may include a processor (e.g., one or more processors) 502, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 500 may further include a communication circuit 504, a memory 506, a mass storage device 508, an input device 510, and/or a communication link 512 (e.g., a communication bus) over which the one or more components shown in the figure may exchange information.

Communication circuit 504 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 506 may include a storage medium (e.g., a non-transitory storage medium) configured to store machine-readable instructions that, when executed, cause processor 502 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 508 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 502. Input device 510 may include a keyboard, a mouse, a voice-controlled input device, a touch sensitive input device (e.g., a touch screen), and/or the like for receiving user inputs to apparatus 500.

It should be noted that apparatus 500 may operate as a standalone device or may be connected (e.g., networked, or clustered) with other computation devices to perform the functions described herein. And even though only one instance of each component is shown in FIG. 5, a skilled person in the art will understand that apparatus 500 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
   at least one processor configured to:
   obtain a sequence of input medical images;
   process the sequence of input medical images through an artificial neural network (ANN), wherein the ANN is trained to reduce both blurriness and noise in the sequence of input medical images; and
   generate, based on the processing, a sequence of output medical images that corresponds to the sequence of input medical images, wherein:
   each of the output medical images is characterized by reduced blurriness and reduced noise compared to a corresponding one of the input medical images;
   the ANN is trained using at least a first training dataset comprising medical images with synthetic noise and a second training dataset comprising medical images with real noise;
   during the training of the ANN, the ANN is configured to predict respective deblurred and denoised medical images based on the medical images comprised in the first training dataset; and
   parameters of the ANN are adjusted during the training based on at least a first loss designed to maintain continuity between consecutive medical images generated by the ANN, a second loss designed to maintain similarity of two or more patches inside a medical image generated by the ANN, and a third loss that indicates a difference between a deblurred and denoised medical image predicted by the ANN based on the first training dataset and a corresponding ground truth image.

2. The apparatus of claim 1, wherein the training of the ANN comprises:
   generating, using the ANN, a first output medical image and a second output medical image based on two consecutive medical images from the second training dataset, respectively;
   determining a first set of noise-resistant features of the first output medical image;
   determining a second set of noise-resistant features of the second output medical image;
   calculating the first loss based at least on the first set of noise-resistant features and the second set of noise-resistant features, wherein the first loss indicates a difference between the first set of noise-resistant features and the second set of noise-resistant features; and
   adjusting the parameters of the ANN to reduce the first loss.

3. The apparatus of claim 2, wherein determining the first set of noise-resistant features of the first output medical image comprises:

extracting a first plurality of features from the first output medical image;
adding noise to the first output medical image to obtain a first noisy output medical image;
extracting a second plurality of features from the first noisy output medical image; and
selecting features that remain substantially unchanged before and after the noise is added to the first output medical image as the first set of noise-resistant features.

4. The apparatus of claim 3, wherein determining the second set of noise-resistant features of the second output medical image comprises:
extracting a third plurality of features from the second output medical image;
adding noise to the second output medical image to obtain a second noisy output medical image;
extracting a fourth plurality of features from the second noisy output medical image; and
selecting features that remain substantially unchanged between and after the noise is added to the second output medical image as the second set of noise-resistant features.

5. The apparatus of claim 3, wherein the first plurality of features and the second plurality of features are extracted using a pre-trained feature extraction neural network.

6. The apparatus of claim 1, wherein the training of the ANN comprises:
generating, using the ANN, a deblurred and denoised medical image based on a medical image from the second training dataset;
determining a first set of noise-resistant features of a first patch inside the deblurred and denoised medical image;
determining a second set of noise-resistant features of a second patch that is inside the deblurred and denoised medical image;
calculating the second loss based at least on the first set of noise-resistant features and the second set of noise-resistant features, wherein the second loss indicates a difference between the first set of noise-resistant features and the second set of noise-resistant features; and
adjusting the parameters of the ANN to reduce the second loss.

7. The apparatus of claim 6, wherein determining the first set of noise-resistant features of the first patch comprises:
extracting a first plurality of features from the first patch;
adding noise to the first patch to obtain a first noisy patch;
extracting a second plurality of features from the first noisy patch; and
selecting features that remain substantially unchanged before and after the noise is added to the first patch as the first set of noise-resistant features.

8. The apparatus of claim 7, wherein determining the second set of noise-resistant features of the second patch comprises:
extracting a third plurality of features from the second patch;
adding noise to the second patch to obtain a second noisy patch;
extracting a fourth plurality of features from the second patch; and
selecting features that remain substantially unchanged before and after the noise is added to the second patch as the second set of noise-resistant features.

9. The apparatus of claim 1, wherein the training of the ANN comprises:
generating, using the ANN, a first deblurred and denoised medical image based on a first medical image of the second training dataset, wherein the first deblurred and denoised medical image is generated by first deblurring the first medical image and then denoising the first medical image;
generating, using the ANN, a second deblurred and denoised medical image based on the first medical image of the second training dataset, wherein the second deblurred and denoised medical image is generated by first denoising the first medical image and then deblurring the first medical image; and
adjusting the parameters of the ANN to reduce a difference between the first deblurred and denoised medical image and the second deblurred and denoised medical image.

10. The apparatus of claim 1, wherein the ANN comprises a plurality of serially coupled sub-networks and wherein each of the serially coupled sub-networks comprises a deblurring module and a denoising module.

11. The apparatus of claim 1, wherein the sequence of input medical images are obtained from an X-ray fluoroscopy video.

12. A method of processing medical images, the method comprising:
obtaining a sequence of input medical images;
processing the sequence of input medical images through an artificial neural network (ANN), wherein the ANN is trained to reduce both blurriness and noise in the sequence of input medical images; and
generating, based on the processing, a sequence of output medical images that corresponds to the sequence of input medical images, wherein:
each of the output medical images is characterized by both reduced blurriness and reduced noise compared to a corresponding one of the input medical images;
the ANN is trained using at least a first training dataset comprising medical images with synthetic noise and a second training dataset comprising medical images with real noise;
during the training of the ANN, the ANN is configured to predict respective deblurred and denoised medical images based on the medical images comprised in the first training dataset; and
parameters of the ANN are adjusted during the training based on at least a first loss designed to maintain continuity between consecutive medical images generated by the ANN, a second loss designed to maintain similarity of two or more patches inside a medical image generated by the ANN, and a third loss that indicates a difference between a deblurred and denoised medical image predicted by the ANN based on the first training dataset and a corresponding ground truth image.

13. The method of claim 12, wherein the training of the ANN comprises:
generating, using the ANN, a first output medical image and a second output medical image based on two consecutive medical images from the second training dataset, respectively;
determining a first set of noise-resistant features of the first output medical image;
determining a second set of noise-resistant features of the second output medical image;
calculating the first loss based at least on the first set of noise-resistant features and the second set of noise-resistant features, wherein the first loss indicates a difference between the first set of noise-resistant features and the second set of noise-resistant features; and adjusting the parameters of the ANN to reduce the first loss.

14. The method of claim 13, wherein determining the first set of noise-resistant features of the first output medical image comprises:
   extracting a first plurality of features from the first output medical image;
   adding noise to the first output medical image to obtain a first noisy output medical image;
   extracting a second plurality of features from the first noisy output medical image; and
   selecting features that remain substantially unchanged before and after the noise is added to the first output medical image as the first set of noise-resistant features.

15. The method of claim 14, wherein the first plurality of features and the second plurality of features are extracted using a pre-trained feature extraction neural network.

16. The method of claim 12, wherein the training of the ANN comprises:
   generating, using the ANN, a deblurred and denoised medical image based on a medical image from the second training dataset;
   determining a first set of noise-resistant features of a first patch inside the deblurred and denoised medical image;
   determining a second set of noise-resistant features of a second patch that is inside the deblurred and denoised medical image;
   calculating the second loss based at least on the first set of noise-resistant features and the second set of noise-resistant features, wherein the second loss indicates a difference between the first set of noise-resistant features and the second set of noise-resistant features; and
   adjusting the parameters of the ANN to reduce the second loss.

17. The method of claim 12, wherein the training of the ANN comprises:
   generating, using the ANN, a first deblurred and denoised medical image based on a first medical image of the second training dataset, wherein the first deblurred and denoised medical image is generated by first deblurring the first medical image and then denoising the first medical image;
   generating, using the ANN, a second deblurred and denoised medical image based on the first medical image of the second training dataset, wherein the second deblurred and denoised medical image is generated by first denoising the first medical image and then deblurring the first medical image; and
   adjusting the parameters of the ANN to reduce a difference between the first deblurred and denoised medical image and the second deblurred and denoised medical image.

18. A non-transitory computer-readable medium comprising instructions that, when executed by a processor included in a computing device, cause the processor to:
   obtain a sequence of input medical images;
   process the sequence of input medical images through an artificial neural network (ANN), wherein the ANN is trained to reduce both blurriness and noise in the sequence of input medical images; and
   generate, based on the processing, a sequence of output medical images that corresponds to the sequence of input medical images, wherein:
      each of the output medical images is characterized by both reduced blurriness and reduced noise compared to a corresponding one of the input medical images;
      the ANN is trained using at least a first training dataset comprising medical images with synthetic noise and a second training dataset comprising medical images with real noise;
      during the training of the ANN, the ANN is configured to predict respective deblurred and denoised medical images based on the medical images comprised in the first training dataset; and
      parameters of the ANN are adjusted during the training based on at least a first loss designed to maintain continuity between consecutive medical images generated by the ANN, a second loss designed to maintain similarity of two or more patches inside a medical image generated by the ANN, and a third loss that indicates a difference between a deblurred and denoised medical image predicted by the ANN based on the first training dataset and a corresponding ground truth image.

* * * * *